Figure 1:
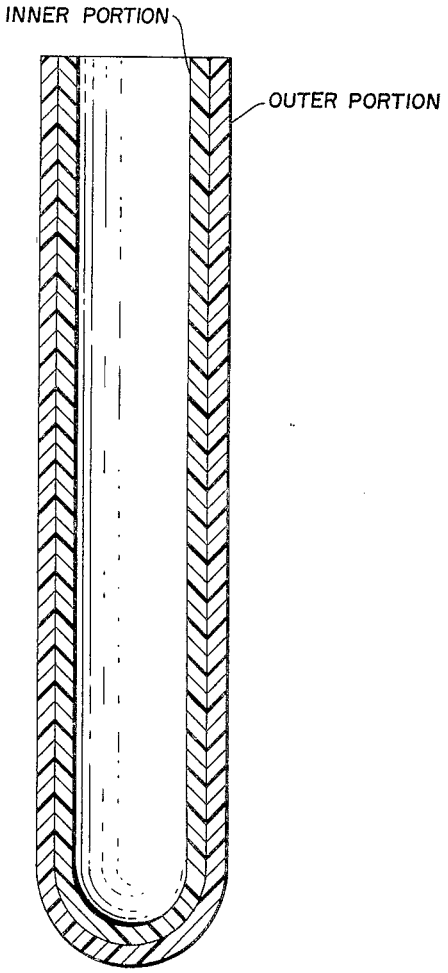

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 6

T950,005
PARISON COMPRISED OF MATING PORTIONS
Edward R. Hollander, Jr., 213 Montezuma St., Kingsport, Tenn. 37664
Filed Aug. 7, 1975, Ser. No. 602,715
**Int. Cl.[2] B32B *9/04***
U.S. Cl. 428—35
1 Sheet Drawing. 3 Pages Specification

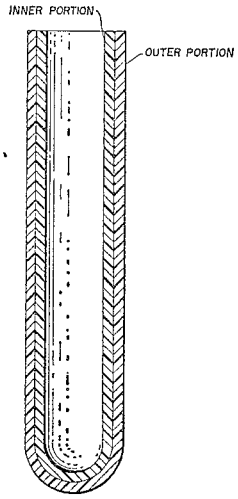

Disclosed is a parison comprised of a plurality of mating portions, at least one of the mating portions being comprised of poly(ethylene terephthalate).

PARISON COMPRISED OF MATING PORTIONS

Original Filed Aug. 7, 1975